United States Patent
Kim et al.

(10) Patent No.: US 7,521,978 B2
(45) Date of Patent: Apr. 21, 2009

(54) CLOCK DRIVER

(75) Inventors: Dong-Hwan Kim, Kyoungki-do (KR); Si-Nae Kim, Kyoungki-do (KR); Kae-Dal Kwack, Kyoungki-do (KR); Jae-Jin Lee, Kyoungki-do (KR)

(73) Assignee: Hynix Semiconductor Inc., Kyoungki-Do (KR)

( * ) Notice: Subject to any disclaimer, the term of this patent is extended or adjusted under 35 U.S.C. 154(b) by 15 days.

(21) Appl. No.: 11/479,290

(22) Filed: Jun. 29, 2006

(65) Prior Publication Data

US 2007/0103220 A1    May 10, 2007

(30) Foreign Application Priority Data

Nov. 2, 2005   (KR) ............... 10-2005-0104561

(51) Int. Cl.
    *G06F 1/04* (2006.01)
(52) U.S. Cl. .............. 327/291; 327/293; 327/296
(58) Field of Classification Search ........ 327/291, 327/293, 294–299, 165, 166
    See application file for complete search history.

(56) References Cited

U.S. PATENT DOCUMENTS

| 5,565,796 A * | 10/1996 | Nakase ............ 326/86 |
| 5,694,445 A | 12/1997 | Hirano et al. |
| 6,025,738 A * | 2/2000 | Masleid .......... 326/83 |
| 6,028,453 A | 2/2000 | Kong |
| 6,097,220 A * | 8/2000 | Huang .......... 326/88 |
| 6,160,422 A * | 12/2000 | Huang .......... 326/95 |
| 6,307,805 B1 | 10/2001 | Anderson et al. |
| 6,433,619 B2 | 8/2002 | Akita et al. |
| 6,549,042 B2 * | 4/2003 | Proebsting .......... 327/51 |
| 6,803,793 B2 | 10/2004 | Inoue |
| 6,847,566 B1 | 1/2005 | Han et al. |
| 6,876,230 B2 | 4/2005 | Choe |
| 6,879,190 B2 * | 4/2005 | Kim et al. .......... 327/108 |
| 6,989,695 B2 * | 1/2006 | Dike et al. .......... 327/142 |

FOREIGN PATENT DOCUMENTS

| JP | 10-201222 | 7/1998 |
| JP | 2002-305437 | 10/2002 |
| KR | 1994-0017206 | 7/1994 |

OTHER PUBLICATIONS

Ilias Bouras, et al., "A High Speed Low Power CMOS Clock Driver Using Charge Recycling Technique", ISCAS 2000—IEEE (pp. V-657, V-660).

* cited by examiner

*Primary Examiner*—Lincoln Donovan
*Assistant Examiner*—Hai L. Nguyen
(74) *Attorney, Agent, or Firm*—Blakely, Sokoloff, Taylor & Zafman LLP

(57) ABSTRACT

A clock driver is provided. A first driving unit is configured with a plurality of drivers and receives a first clock signal to drive a first pumping clock. A second driving unit is configured with a plurality of drivers and receives a second clock signal to drive a second pumping clock. A charge recycling switch is connected between an output terminal of the first driving unit and an output terminal of the second driving unit. A switch controller selectively transfers an input clock signal of the first or second driving unit to the charge recycling switch in response to the first and second pumping clock signals.

13 Claims, 8 Drawing Sheets

| CLOAD [pF] | DRIVER [mW] | CONV [mW] | PROP [mW] |
|---|---|---|---|
| 10 | 2.0733 | 1.5709 | 1.5013 |
| 20 | 3.5760 | 3.0480 | 2.8495 |
| 30 | 4.9045 | 4.4103 | 4.1885 |
| 40 | 8.4511 | 5.7437 | 5.5148 |
| 50 | 10.1870 | 7.0946 | 6.8665 |

| CLOAD [pF] | DRIVER [mW] | CONV [mW] | PROP [mW] |
|---|---|---|---|
| 10 | 1.6563 | 1.5822 | 1.4897 |
| 20 | 3.839 | 3.015 | 2.9139 |
| 30 | 5.0576 | 4.396 | 4.1531 |
| 40 | 6.4611 | 5.709 | 5.4832 |
| 50 | 10.421 | 7.017 | 6.7785 |

| CLOAD [pF] | DRIVER [mW] | CONV [mW] | PROP [mW] |
|---|---|---|---|
| 10 | 1.7399 | 1.5428 | 1.5156 |
| 20 | 3.2105 | 3.0150 | 2.8995 |
| 30 | 5.7564 | 4.3800 | 4.1393 |
| 40 | 6.8883 | 5.7001 | 5.3967 |
| 50 | 8.1095 | 6.9667 | 6.7387 |

| CLOAD [pF] | DRIVER [mW] | CONV [mW] | PROP [mW] |
|---|---|---|---|
| 10 | 1.7250 | 1.5445 | 1.5385 |
| 20 | 3.2743 | 2.9972 | 2.9160 |
| 30 | 5.5349 | 4.4184 | 4.2626 |
| 40 | 6.7891 | 5.7960 | 5.5916 |
| 50 | 8.5513 | 7.1181 | 6.9389 |

| CLOAD [pF] | DRIVER [mW] | CONV [mW] | PROP [mW] |
|---|---|---|---|
| 10 | 1.6942 | 1.5983 | 1.4922 |
| 20 | 3.9500 | 3.0285 | 2.8832 |
| 30 | 5.4483 | 4.4516 | 4.2457 |
| 40 | 6.6011 | 5.7886 | 5.6140 |
| 50 | 8.7900 | 7.1257 | 7.0008 |

CLOCK DRIVER

FIELD OF THE INVENTION

The present invention relates to a semiconductor memory device; and, more particularly, to a clock driver with low power consumption to control a large-capacity load capacitor.

DESCRIPTION OF RELATED ART

As semiconductor memory devices are integrated more highly, their power consumption also increases. Therefore, the reduction of the power consumption is a big issue in the highly integrated semiconductor memory devices.

A power supply voltage used in the semiconductor memory device is closely associated with power consumption. That is, the reduction of the power supply voltage results in the reduction of the power consumption. However, threshold voltages of transistors are not always changed even though the semiconductor memory devices are highly integrated. Thus, a voltage higher than the power supply voltage, i.e., a high voltage VPP, has to be applied to a word line so as to access a selected memory cell. For this purpose, a VPP pumping circuit is provided on on-chip to generate the high voltage VPP. Meanwhile, it is well known that the VPP pumping circuit can be used in an output buffer or the like.

The VPP pumping circuit includes a VPP pump for generating the high voltage VPP, a detector for detecting a level of the high voltage VPP, and an oscillator for supplying an oscillation signal to the VPP pump in response to an output signal of the detector.

Recently, a high voltage generating scheme has been proposed which employs a clock driver in a VPP pumping circuit under the lower power consumption environment.

Regarding this scheme, a typical clock driver is disclosed in a book entitled "CMOS LOGIC CIRCUIT DESIGN", 1999, John P. Uyemura, pp. 140-144.

FIG. 1 is a circuit diagram of a conventional clock driver.

Referring to FIG. 1, the conventional clock driver has two clock input terminals to which complementary clock signals CLK_IN and CLKB_IN are respectively inputted so that two capacitors CLOAD_1 and CLOAD_2 are charged or discharged. Specifically, to drive large-capacity load capacitance, large-capacity load capacitors are driven using inverter chains whose W/L ratios are increased by about 2.71 times (exponent). At this point, much power is consumed in driving the large-capacity capacitor to logic "HIGH" or logic "LOW".

Also, even if the power consumption used in charging or discharging the capacitors is excluded, much current loss occurs in the inverter chains during a transient period in which the logic level is changed. In such a clock driver, when the signal is changed, electric charges in the capacitors are all discharged through an NMOS transistor disposed in a last stage of the inverter, thus exhibiting the low power efficiency.

To solve this problem, a charge-recycling method is proposed as one of power saving methods. That is, the charge-recycling method can increase the power efficiency of the clock driver but reduce the delay time.

According to the charge-recycling method, however, the driving of the charge recycling consumes much power when the structure is complicated or the area is too large.

FIG. 2 is a circuit diagram of another clock driver of the related arts to implement a charge recycling by controlling a single control MOS transistor using two XOR gates and one NOR gate (E. D. Kyriakis-Bitzaros, S. S. Nikolaidis, "Design of Low Power CMOS Drivers Based on Charge Recycling" IEEE International Symposium on Circuits and Systems, Jun. 9-12, 1997, Hong Kong.)

An operation principle of the clock driver illustrated in FIG. 2 will be described below on the assumption that input clock signals CLK_IN and CLKB_IN are a high signal and a low signal, respectively. At the moment when the input clock signals CLK_IN and CLKB_IN are respectively changed into a low signal and a high signal, output clock signals CLK_OUT and CLKB_OUT are respectively changed into a high signal and a low signal not immediately but a predetermined delay time due to high-capacity load capacitance. During this delay time, there occur a period in which the input clock signal CLK_IN is equal to the output clock signal CLK_OUT, and a period in which the input clock signal CLKB_IN is equal to the output clock signal CLKB_OUT. In this case, the outputs of the two XOR gates output logic high just before this period and then output logic low at this period. When the outputs of the two XOR gates are low, the output of the NOR gate is high, so that a control MOS transistor MN1 is turned on. Some charges are added from one capacitor, which is charged just before the clock is changed through the control MOS transistor MN1, to the other capacitor that is being charged during the transient period. In this manner, the charge recycling method is implemented using the three logic gates and the single MOS transistor.

In the scheme of FIG. 2, although the charge recycling method is implemented using the single MOS transistor, the signals pass through two gates and then drive the control MOS transistor MN1 in terms of the logic implementation. Therefore, the control voltage has a predetermined delay. Although the author of the paper does not specify the concrete scheme of the XOR gate or NOR gate, a considerable delay may occur in the worst case, considering the typical structure of the XOR gate or NOR gate.

FIG. 3 is a circuit diagram of a NAND control type clock driver among the conventional charge recycling methods.

The NAND control type clock driver has a simple structure, occupies a small area, and can effectively save power. (Ilias Bouras, Yiannis Liaperdos, Angela Arapoyanni, "A High Speed Low Power CMOS Clock Driver Using Charge Recycling Technique" IEEE International Symposium on Circuits and Systems, May 28-31, 2000, Geneva, Switzerland)

An operation principle of the clock driver illustrated in FIG. 3 will be described below on the assumption that input clock signals CLK_IN and CLKB_IN are a low signal and a high signal, respectively. At the moment when the input clock signals CLK_IN and CLKB_IN are respectively changed into a high signal and a low signal, output clock signals CLK_OUT and CLKB_OUT are respectively changed into a low signal and a high signal not immediately but a predetermined delay time due to high-capacity load capacitance. That is, at the moment when the input clock signal CLK_IN is changed from the low signal to the high signal, the output clock_signal CLK_OUT is not directly changed to the low signal, but is maintained at a high level for a short time. Therefore, during this time, an output of a first NAND gate becomes low and a first control signal CTL1 becomes low, so that a first control transistor MP1 is turned on. At this point, electric charges charged just before at a first capacitor CL3 are charged into a second capacitor CL4 through the first control transistor MP1. Then, when the output clock signal CLK_OUT is fully discharged and thus becomes a low signal, the first control signal CTL1 becomes high so that the first control transistor MP1 is turned off. In this manner, when the clock is changed one time within a half period, the charge recycling occurs one time.

On the contrary, in the case where the input clock signals CLK_IN and CLKB_IN are a high signal and a low signal, respectively, at the moment when the input clock signals CLK_IN and CLKB_IN are respectively changed into a low signal and a high signal, the output clock signals CLK_OUT and CLKB_OUT are respectively changed into a high signal and a low signal not immediately but a predetermined delay time due to high-capacity load capacitance. That is, at the moment when the input clock signal CLK_IN is changed from the high signal to the low signal, the output clock signal CLKB_OUT is not directly changed to the low signal, but is maintained at a high level for a short time. Therefore, during this time, the output of the second NAND gate becomes low and a second control signal CTL2 becomes low, so that a second control transistor MP2 is turned on. At this point, electric charges charged just before at the second capacitor CL4 are charged into the first capacitor CL3 through the second control transistor MP2. Then, when the output clock signal CLKB_OUT is fully discharged and thus becomes a low signal, the second control signal CTL2 becomes high so that the second control transistor MP2 is turned off. In this manner, the charge recycling occurs one time during the transient period when the clock is changed one time within the rest half period.

According to the NAND control type charge recycling structure of FIG. 3, when the input at the last stage of the inverter chain is changed from a logic low level to a logic high level, the control signal is changed from a logic high level to a logic low level during the delay time, so that the PMOS transistor is turned on.

Unlike the structure of FIG. 2, the structure of FIG. 3 can reduce the number and size of the logic gates, but two PMOS transistors occupying the largest area are used. Referring to the paper disclosing the structure of FIG. 3, when the clock driver driving a 50-pF load capacitor is used, the widths of the PMOS transistors MP1 and MP2 are 125 μm. Compared with the size of the inverter chain, the width of 125 μm is not negligible.

Also, when comparing the NMOS transistor with the PMOS transistor, the charge mobility of the PMOS transistor is lower than that of the NMOS transistor. Thus, to secure the same current drivabitlity, the circuit configured with the PMOS transistors has to occupy a larger area than that of the circuit configured with the NMOS transistors.

FIG. 4 is a circuit diagram of another clock driver of the related arts, using two NOR gates and two NMOS transistors to implement a charge recycling (Ilias Bouras, Yiannis Liaperdos, Angela Arapoyanni, "A High Speed Low Power CMOS Clock Driver Using Charge Recycling Technique" IEEE International Symposium on Circuits and Systems, May 28-31, 2000, Geneva, Switzerland). An operation of the charge recycling structure of FIG. 4 is similar to that of FIG. 3.

An operation principle of the clock driver illustrated in FIG. 4 will be described below on the assumption that input clock signals CLK_IN and CLKB_IN are a high signal and a low signal, respectively. At the moment when the input clock signals CLK_IN and CLKB_IN are respectively changed into a low signal and a high signal, output clock signals CLKB_OUT and CLKB_OUT are respectively changed into a high signal and a low signal not immediately but a predetermined delay time due to high-capacity load capacitance. That is, at the moment when the input clock signal CLK_IN is changed from the high signal to the low signal, the output clock signal CLK_OUT is not directly changed to the high signal, but is maintained at a low level for a short time. Therefore, during this time, an output of a first NOR gate becomes high and a first control signal CTL3 becomes high, so that a first control transistor MN2 is turned on. At this point, electric charges charged just before at a second capacitor CL6 are charged into a first capacitor CL5 through the first control transistor MN2. Then, when the output clock signal CLK_OUT is fully charged and thus becomes a high signal, the first control signal CTL3 becomes low so that the first control transistor MN2 is turned off. In this manner, when the clock is changed one time within a half period, the charge recycling occurs one time.

On the contrary, in the case where the input clock signals CLK_IN and CLKB_IN are a low signal and a high signal, respectively, at the moment when the input clock signals CLK_IN and CLKB_IN are respectively changed into a high signal and a low signal, the output clock signals CLK_OUT and CLKB_OUT are respectively changed into a low signal and a high signal not immediately but a predetermined delay time due to high-capacity load capacitance. That is, at the moment when the input clock signal CLK_IN is changed from the high signal to the low signal, the output clock signal CLKB_OUT is not directly changed to the high signal, but is maintained at a low level for a short time. Therefore, during this time, an output of a second NOR gate becomes high and a second control signal CTL4 becomes high, so that a second control transistor MN3 is turned on. At this point, electric charges charged just before at the first capacitor CL5 are charged into the second capacitor CL6 through the second control transistor MN3. Then, when the output clock signal CLKB_OUT is fully charged and thus becomes a high signal, the second control signal CTL4 becomes low so that the second control transistor MN3 is turned off.

According to the NOR control type charge recycling structure of FIG. 4, when the input at the last stage of the inverter chain is changed from a logic high level to a logic low level, the control signal is changed from a logic low level to a logic high level during the delay time, so that the NMOS transistor is turned on.

Unlike the structure of FIG. 2, the structure of FIG. 4 degrades the area efficiency because it uses two control transistors. Compared with the structure of FIG. 3, the NOR control type charge recycling structure of FIG. 4 is suitable in the general implementation in terms of the area efficiency.

In the aforementioned paper, the charge recycling method of the clock driver driving large-sized capacitors of 40-90 pF was implemented and simulated. However, the simulation result showed that the charge recycling efficiency was degraded as much as about 10-20 pF.

SUMMARY OF THE INVENTION

It is, therefore, an object of the present invention to provide a clock driver that can provide excellent charge recycling efficiency and reduce the occupation area.

It is another object of the present invention to provide a clock driver that can improve the charge recycling time while implementing a reduced logic configuration.

It is a further object of the present invention to provide a clock driver that can improve the charge recycling efficiency by reducing the time delay.

It is a still further object of the present invention to provide a clock driver that can reduce the charge recycling efficiency through a simple logic configuration, regardless of the number and size of an inverter chain.

In accordance with an aspect of the present invention, there is provided a clock driver including: a first driving unit configured with a plurality of drivers and receiving a first clock signal to drive a first pumping clock; a second driving unit configured with a plurality of drivers and receiving a second clock signal to drive a second pumping clock; a charge recycling switch connected between an output terminal of the first driving unit and an output terminal of the second driving unit; and a switch controller for selectively transferring an input clock signal of the first or second driving unit to the charge recycling switch in response to the first and second pumping clock signals.

The charge recycling switch may be configured with an NMOS transistor.

The charge recycling switch may be configured with a PMOS transistor.

The switch controller may be configured with two transmission gates.

The switch controller may be configured with an XOR gate.

The switch controller may be configured with an XNOR gate.

The first driving unit may be configured with a plurality of inverter chains.

The second driving unit may be configured with a plurality of inverter chains.

In accordance with another embodiment of the present invention, there is provided a clock driver including: a first clock-first driver receiving a first clock signal; a first clock-second driver connected to an output terminal of the first clock-first driver; a first clock-third driver connected to an output terminal of the first clock-second driver to output a first pumping clock; a second clock-first driver receiving a second clock signal; a second clock-second driver connected to an output terminal of the second clock-first driver; a second clock-third driver connected to an output terminal of the second clock-second driver to output a second pumping clock signal; a charge recycling switch connected between an output terminal of the first clock-third driver and an output terminal of the second clock-third driver; and a switch controller for selectively transferring an input clock signal of the first clock-second driver or the second clock-second driver to the charge recycling switch in response to the first and second pumping clock signals.

The charge recycling switch may be configured with an NMOS transistor.

The charge recycling switch may be configured with a PMOS transistor.

The switch controller may be configured with two transmission gates.

The switch controller may be configured with an XOR gate.

The switch controller may be configured with an XNOR gate.

The first clock-first driver, the first clock-second driver, the first clock-third driver, the second clock-first driver, the second clock-second driver, and the second clock-third driver may be configured with inverters, respectively.

The first clock-first driver may be configured with a plurality of inverters.

The second clock-first driver may be configured with a plurality of inverters.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

A clock driver in accordance with exemplary embodiments of the present invention will be described in detail with reference to the accompanying drawings.

Figure 5:
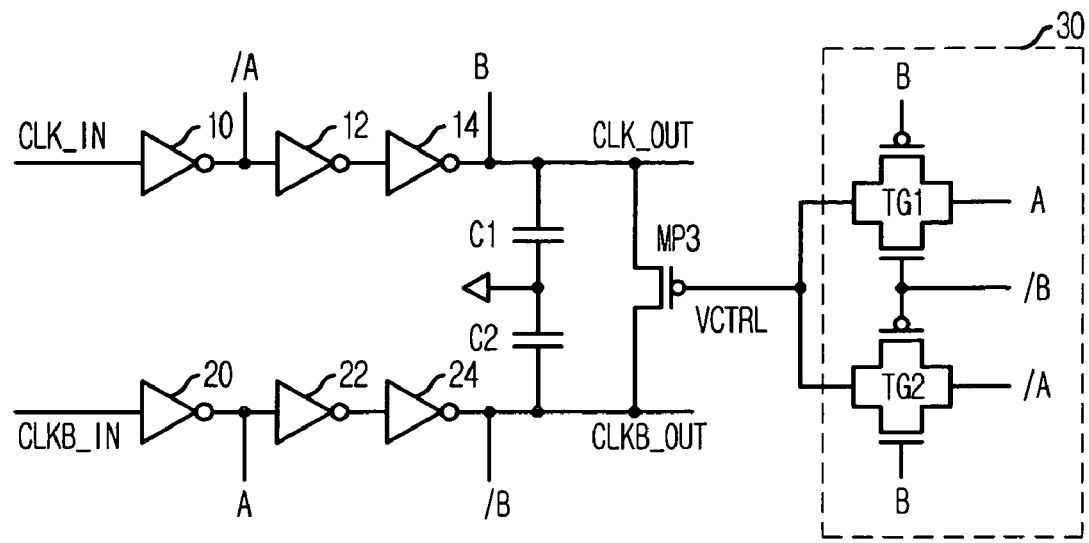
FIG. 5 is a circuit diagram of a clock driver in accordance with an embodiment of the present invention.

FIG. 5 is a circuit diagram of a clock driver in accordance with an embodiment of the present invention.

Referring to FIG. 5, the clock driver includes a first clock-first driver 10, a first clock-second driver 12, a first clock-third driver 14, a second clock-first driver 20, a second clock-second driver 22, a second clock-third driver 24, a charge recycling switch MP3, a switch controller 30, and first and second capacitors C1 and C2.

The first clock-first driver 10 receives a first clock signal CLK_IN, the first clock-second driver 12 is connected to an output terminal of the first clock-first driver 10, and the first clock-third driver 14 is connected to an output terminal of the first clock-second driver 12 to output a first pumping clock CLK_OUT. The second clock-first driver 20 receives a second clock signal CLKB_IN, the second clock-second driver 22 is connected to an output terminal of the second clock-first driver 20, and the second clock-third driver 24 is connected to an output terminal of the second clock-second driver 22 to output a second pumping clock signal CLKB_OUT. The charge recycling switch MP3 is connected between an output terminal of the first clock-third driver 14 and an output terminal of the second clock-third driver 24. The switch controller 30 selectively transfers the input clock signals of the first clock-second driver 12 and the second clock-second driver 22 to the charge recycling switch MP3 in response to the first and second pumping clock signals CLK_OUT and CLKB_OUT. The first capacitor C1 is connected to the output terminal of the first clock-third driver 14, and the second capacitor C2 is connected to the output terminal of the second clock-third driver 24.

The first clock-first driver 10, the first clock-second driver 12, the first clock third driver 14, the second clock-first driver 20, the second clock-second driver 22, and the second clock-third driver 24 are configured with inverters, respectively.

The charge recycling switch MP3 is configured with a PMOS transistor.

The switch controller 30 is configured with two transmission gates TG1 and TG2, constituting an exclusive OR (XOR) gate.

It should be noted that the input clocks of the first clock-second driver 12 and the second clock-second driver 22 are applied as the input signals of the switch controller 30.

Although FIG. 5 exemplarily illustrates the first clock-first driver 10 and the second clock-first driver 20 configured with a single inverter, respectively, they can also be configured with a plurality of inverters, considering that a general clock driver includes a plurality of inverter chains.

Figure 1:
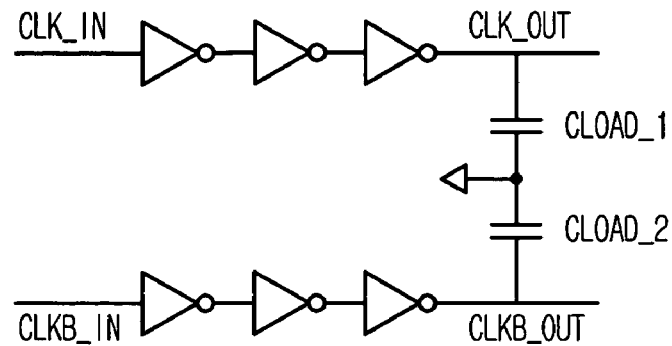
FIG. 1 is a circuit diagram of a conventional clock driver.
Figure 2:
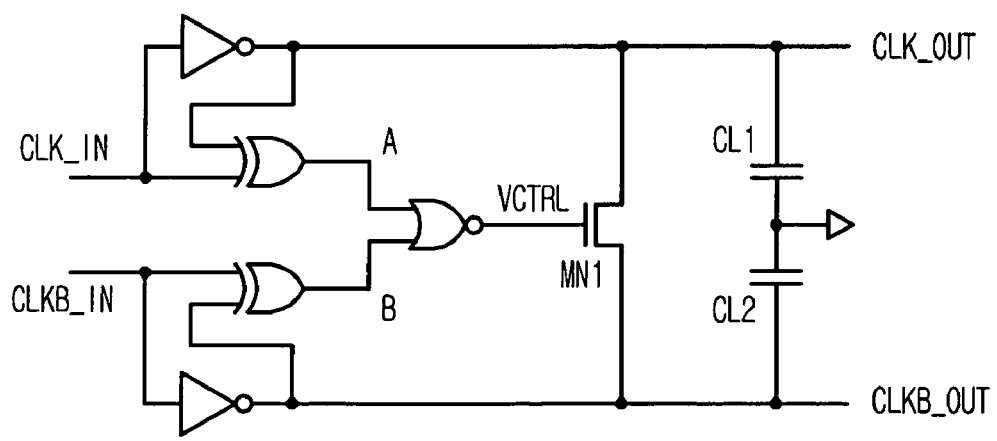
FIG. 2 is a circuit diagram of a conventional 2XOR/1NOR type clock driver.
Figure 3:
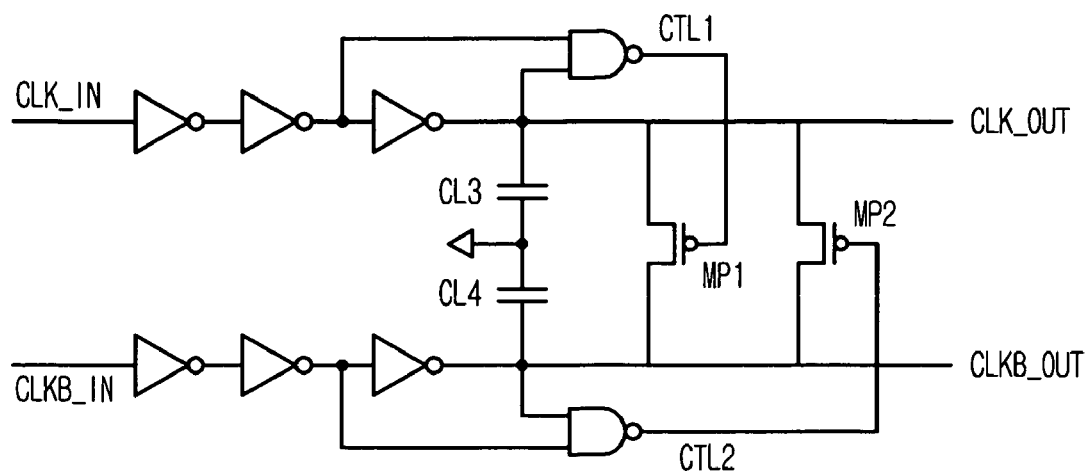
FIG. 3 is a circuit diagram of a conventional NAND control type clock driver.
Figure 4:
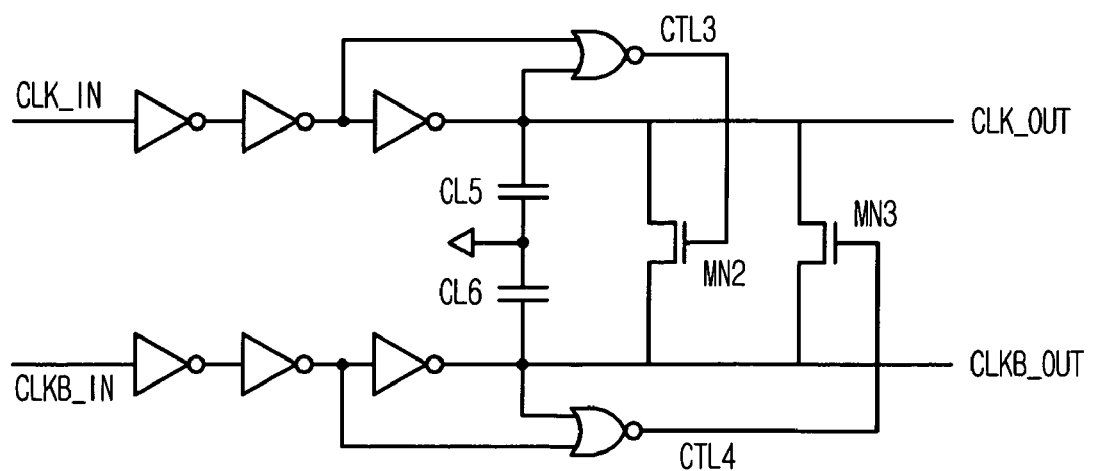
FIG. 4 is a circuit diagram of a conventional NOR control type clock driver.

Referring again to FIG. 5, the XOR gate is configured using two transmission gates TG1 and TG2, and the charge recycling switch MP3 for controlling the charge recycling is configured using a single PMOS transistor. Therefore, the size of the logic circuits for driving the charge recycling can be reduced by almost half, compared with the NAND control type structure of FIG. 3. In order for driving a large current by increasing the size of the charge recycling switch MP3, the size of the logic gates must also be large. Consequently, the area of the clock driver increases and more power is required to drive the charge recycling. Also, compared with the clock driver, the size of the charge recycling switch MP3 is considerably large.

To solve the problem that the charge recycling switch MP3 is turned on slightly late even though the input values of the last stages of the first clock-third driver 14 and the second clock-third driver 24 have been already changed, the charge recycling switch MP3 is turned on as early as one delay time of the driver (i.e., the inverter) without comparing the input signals and the output signals of the last stage of the clock driver (that is, the first clock-third driver 14 and the second clock-third driver 24). Therefore, the charge recycling is generated earlier, thereby increasing the power efficiency compared with the convention structure.

Upon the operation of the clock driver, by using two transmission gates TG1 and TG2 without using the NAND requiring four MOS transistors, the XOR gate outputs a low signal during a period in which a B signal is equal to an A signal due to a delay time, so that the charge recycling switch MP3 is turned on. During this period, some of electric charges charged in the first or second capacitors C1 or C2 just before the clock signal is changed are charged through the charge recycling switch MP3 into the load capacitor that is to be charged in response to a next clock signal, thus generating the charge recycling. On the contrary, the case of a /A signal and a /B signal is similar to the aforementioned driving principle. In a driver of complementary 2-phase clocks, the charge recycling occurs every time a signal of one inverter is changed. Like the conventional structure, the charge recycling occurs two times during 1 cycle.

Figure 6:
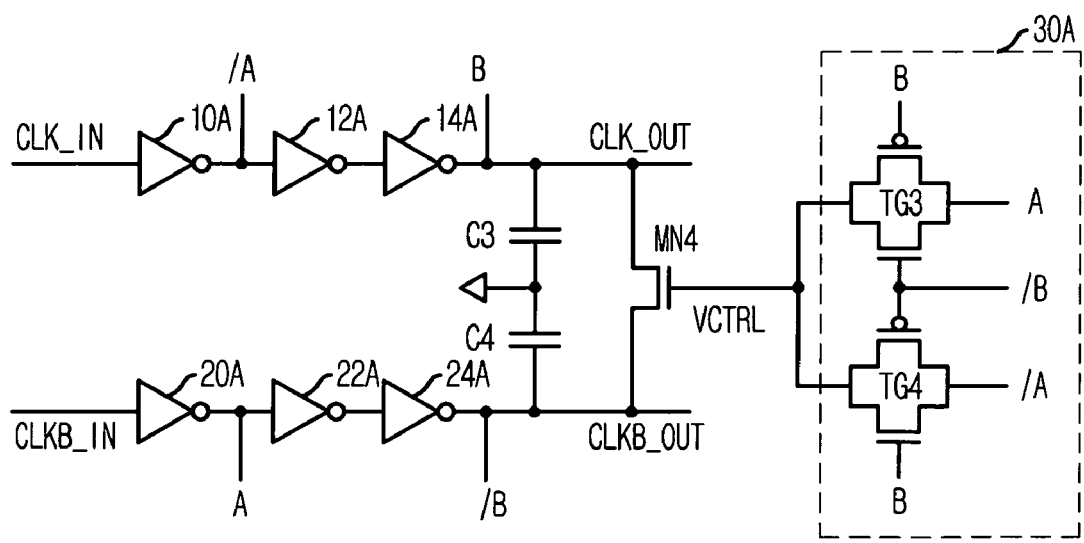
FIG. 6 is a circuit diagram of a clock driver in accordance with another embodiment of the present invention.

FIG. 6 is a circuit diagram of a clock driver in accordance with another embodiment of the present invention.

Referring to FIG. 6, the clock driver includes a first clock-first driver 10A a first clock-second driver 12A, a first clock-third driver 14A, a second clock-first driver 20A, a second clock-second driver 22A, a second clock-third driver 24A, a charge recycling switch MN4, a switch controller 30A, and first and second capacitors C3 and C4.

The first clock-first driver 10A receives a first clock signal CLK_IN, the first clock-second driver 12A is connected to an output terminal of the first clock-first driver 10A, and the first clock-third driver 14A is connected to an output terminal of the first clock-second driver 12A to output a first pumping clock CLK_OUT. The second clock-first driver 20A receives a second clock signal CLKB_IN, the second clock-second driver 22A is connected to an output terminal of the second clock-first driver 20A, and the second clock-third driver 24A is connected to an output terminal of the second clock-second driver 22A to output a second pumping clock signal CLKB_OUT. The charge recycling switch MN4 connected between an output terminal of the first clock-third driver 14A and an output terminal of the second clock-third driver 24A. The switch controller 30A selectively transfers the input clock signals of the first clock-second driver 12A or the second clock-second driver 22A to the charge recycling switch MN4 in response to the first and second pumping clock signals CLK_OUT and CLKB_OUT. The first capacitor C3 is connected to the output terminal of the first clock-third driver 14A, and the second capacitor C4 is connected to the output terminal of the second clock-third driver 24A.

The switch controller 30A is configured with two transmission gates TG3 and TG4, constituting an exclusive NOR (XNOR) gate.

Referring again to FIG. 6, the XNOR gate is configured using two transmission gates TG3 and TG4, and the charge recycling switch MN4 for controlling the charge recycling is configured using a single NMOS transistor. Also, the structure of FIG. 6 is configured with the XNOR gate and the NMOS transistor, instead of the XOR gate and the PMOS transistor in FIG. 5, and its operation principle is similar to that of FIG. 5.

To solve the problem that the charge recycling switch MN4 is turned on slightly late even though the input values of the last stages of the first clock-third driver 14A and the second clock-third driver 24A have been already changed, the charge recycling switch MN4 is turned on as early as one delay time of the inverter without comparing the input signals and the output signals of the last stage of the clock driver. Therefore, the charge recycling is generated earlier, thereby increasing the power efficiency compared with the convention structure.

Upon the operation of the clock driver, during a period in which the clock signal is not changed, the XOR gate outputs a low signal and a B signal is changed with a delay. Then, during a period in which the B signal is equal to an A signal due to a delay time, the XNOR gate outputs a high signal, so that the charge recycling switch MN4 is turned on. The charge recycling occurs during this period.

Compared with the XOR/PMOS control type structure of FIG. 5, the clock driver of FIG. 6 having the NMOS transistor as the switching transistor is more suitable in terms of the area efficiency of the control logic gate.

Figures 7A, 7B:
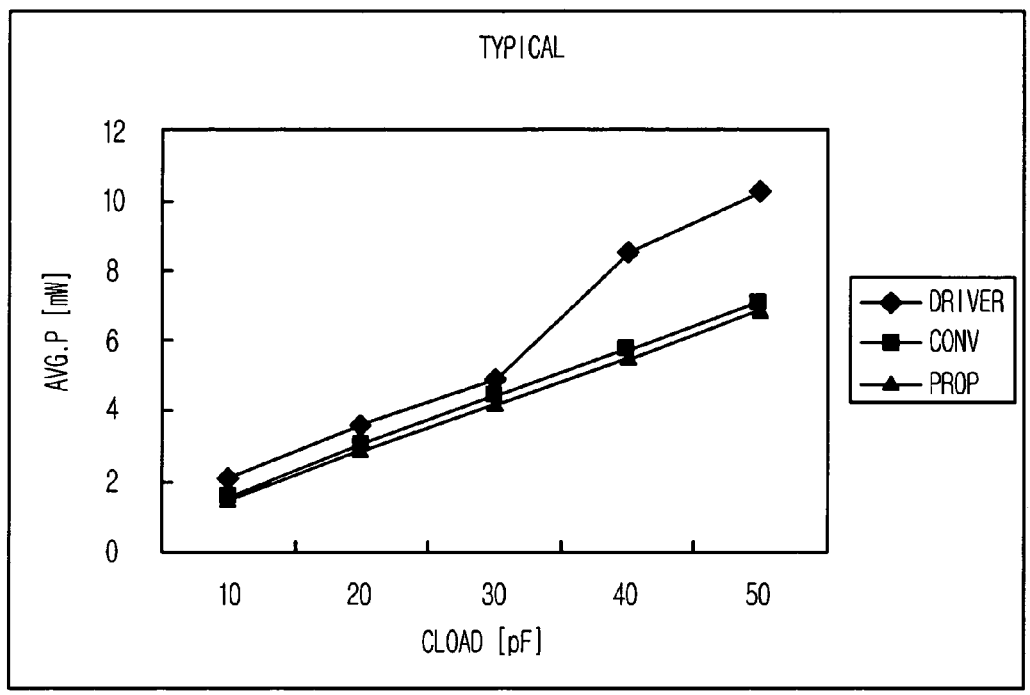
FIGS. 7A and 7B are waveforms illustrating the simulation of power consumption in a typical condition.

FIGS. 7A and 7B are waveforms illustrating the simulation of power consumption in a typical condition. In the clock driver of FIG. 6, the power consumption is simulated in a range between 10 pF and 50 pF at a 10 pF interval in each skew condition.

In FIG. 7A, "DRIVER" represents a driver that does not use the charge recycling method, "CONV" represents a conventional charge recycling method, and "PROP" represents the charge recycling method.

As shown in FIG. 7B, "DRIVER" that does not use the charge recycling method shows the worst power consumption trait, and "PROP" that uses the charge recycling method of the present invention shows the best power consumption trait.

Figures 8A, 8B:
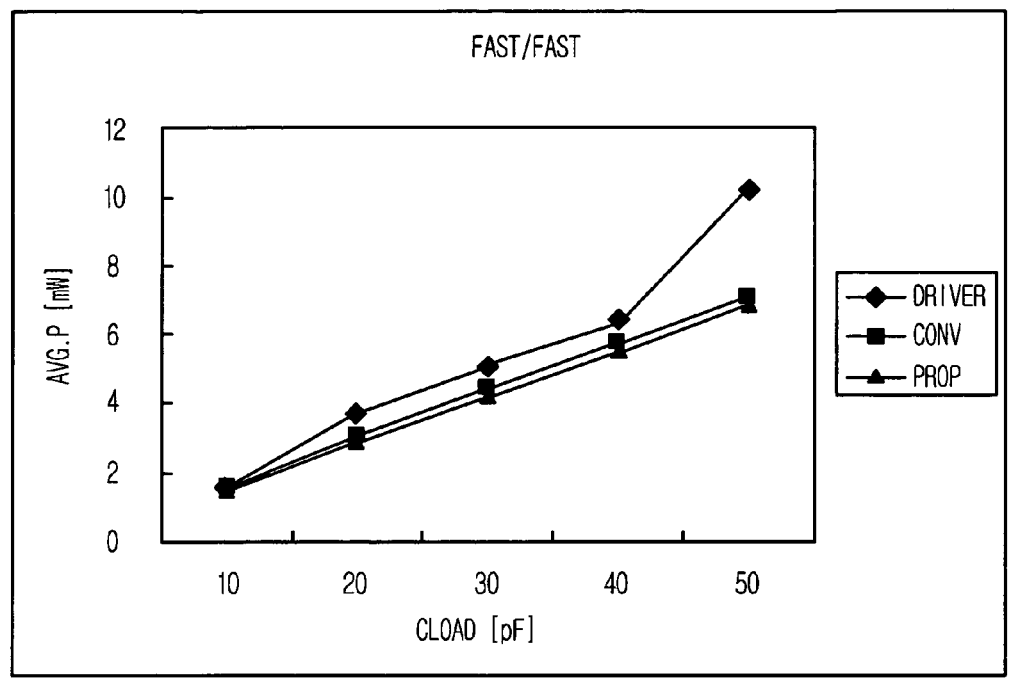
FIGS. 8A and 8B are waveforms illustrating the simulation of power consumption in a fast/fast condition.

FIGS. 8A and 8B are waveforms illustrating the simulation of power consumption in a fast/fast (NMOS/PMOS) condition. "FAST" represents the fast operation state of the MOS transistor based on the process condition or the like. That is, "FAST" means a relatively good environment.

As shown in FIGS. 8A and 8B, "DRIVER" also shows the worst power consumption trait, and "PROP" also shows the best power consumption trait.

Figures 9A, 9B:
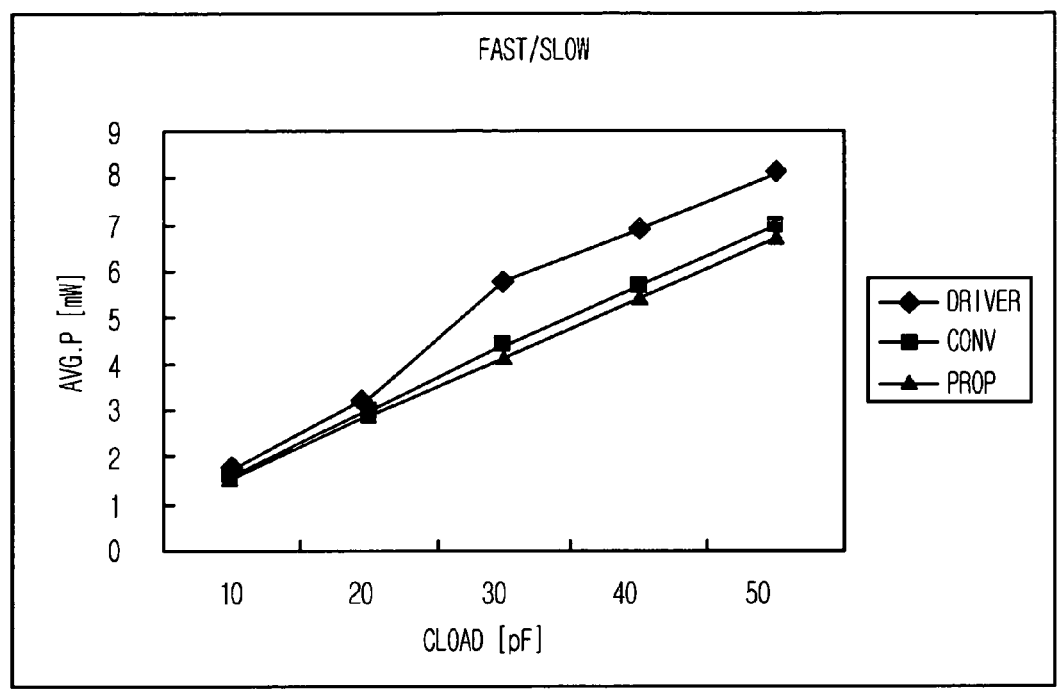
FIGS. 9A and 9B are waveforms illustrating the simulation of power consumption in a fast/slow condition.

FIGS. 9A and 9B are waveforms illustrating the simulation of power consumption in a fast/slow (NMOS/PMOS) condition. "SLOW" represents a slow operation state of the MOS transistor based on the process condition or the like. That is, "SLOW" means a relatively poor environment.

As shown in FIGS. 9A and 9B, "DRIVER" shows the worst power consumption trait, and "PROP" also the best power consumption trait.

Figures 10A, 10B:
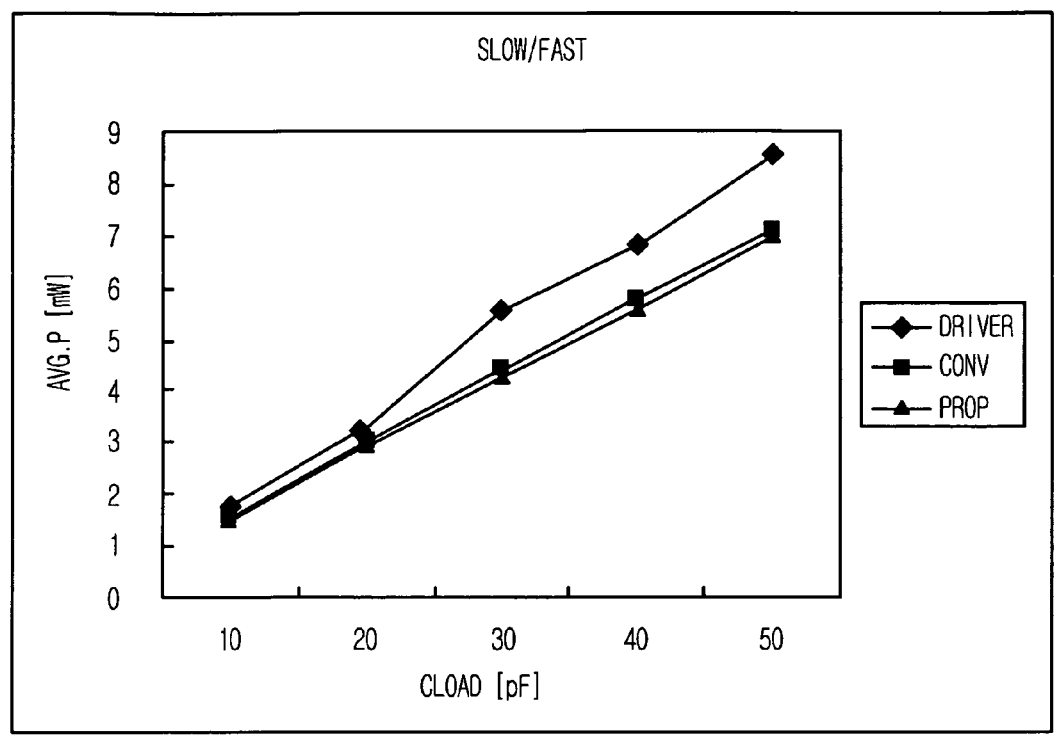
FIGS. 10A and 10B are waveforms illustrating the simulation of power consumption in a slow/fast condition.

FIGS. 10A and 10B are waveforms illustrating the simulation of power consumption in a slow/fast (NMOS/PMOS) condition.

Figures 11A, 11B:
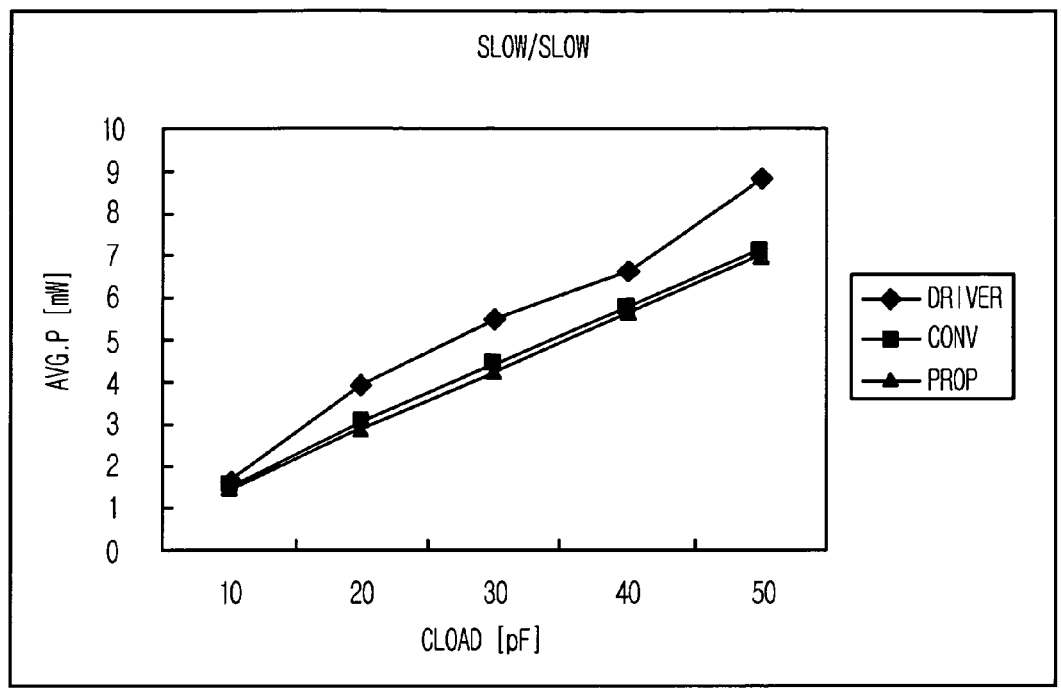
FIGS. 11A and 11B are waveforms illustrating the simulation of power consumption in a slow/slow condition.

As shown in FIGS. 10A and 11B, "DRIVER" shows the worst power consumption trait, and "PROP" also the best power consumption trait.

FIGS. 11A and 11B are waveforms illustrating the simulation of power consumption in a slow/slow (NMOS/PMOS) condition.

As shown in FIGS. 11A and 11B, "DRIVER" shows the worst power consumption trait, and "PROP" also the best power consumption trait.

As described above, the clock driver in accordance with the present invention uses the charge recycling method that can recycle some of the charged charges. Also, the structure of the clock driver is very simplified, and the area of the additional circuits for implementing the charge recycling is reduced by half. Further, a detecting node can be changed without additional devices or methods and the high power efficiency can be obtained. When the simulation is performed in a range between 10 pF and 50 pF, the power consumption can be reduced up to 6.51%. Compared with the conventional clock driver that does not use the charge recycling, the power consumption can be reduced up to 34.75%. Considering that the clock driver driving the large-capacity capacitor has the power consumption ranging from several mA to tens mA, the power consumption reduction of 34.75% is very great. Also, as can be seen from the comparison of the delay time, a power delay product (PDP) given by multiplying an average current by a delay time is also reduced at the same time, thus exhibiting good characteristics.

Moreover, compared with the conventional structure with respect to the load capacitance ranging between 10 pF and 50 pF, it can be seen that the power consumption is reduced in all skew conditions.

The present application contains subject matter related to Korean patent application No. 2005-104561, filed in the Korean Intellectual Property Office on Nov. 2, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A clock driver, comprising:
   a first driving unit configured with a plurality of drivers and receiving a first clock signal to drive a first pumping clock signal and output a first input clock signal;
   a second driving unit configured with a plurality of drivers and receiving a second clock signal to drive a second pumping clock signal and output a second input clock signal;
   a charge recycling switch connected between an output terminal of the first driving unit and an output terminal of the second driving unit; and
   a switch controller for selectively transferring the first input clock signal or the second input clock signal to the charge recycling switch in response to the first and second pumping clock signals, wherein the switch controller is configured with two transmission gates each to receive a respective one of the input clock signals,
   wherein the charge recycling switch is connected to the two transmission gates.

2. The clock driver as recited in claim 1, wherein the charge recycling switch is configured with an NMOS transistor.

3. The clock driver as recited in claim 1, wherein the charge recycling switch is configured with a PMOS transistor.

4. The clock driver as recited in claim 1, wherein the plurality of drivers of the first driving unit includes a plurality of inverter chains.

5. The clock driver as recited in claim 1, wherein the plurality of drivers of the second driving unit includes a plurality of inverter chains.

6. The clock driver as recited in claim 1, further comprising:
   a first capacitor connected to the output terminal of the first driving unit; and
   a second capacitor connected to the output terminal of the second driving unit.

7. A semiconductor device for driving clocks, comprising:
   a first clock-first driver receiving a first clock signal and outputting a first input clock signal;
   a first clock-second driver connected to an output terminal of the first clock-first driver;
   a first clock-third driver connected to an output terminal of the first clock-second driver to output a first pumping clock signal;
   a second clock-first driver receiving a second clock signal and outputting a second input clock signal;
   a second clock-second driver connected to an output terminal of the second clock-first driver;
   a second clock-third driver connected to an output terminal of the second clock-second driver to output a second pumping clock signal;
   a charge recycling switch connected between an output terminal of the first clock-third driver and an output terminal of the second clock-third driver; and
   a switch controller for selectively transferring the first input clock signal or the second input clock signal to the charge recycling switch in response to the first and second pumping clock signals,
   wherein the switch controller is configured with two transmission gates each to receive a respective one of the input clock signals,
   wherein the charge recycling switch is connected to the two transmission gates.

8. The semiconductor device as recited in claim 7, wherein the charge recycling switch is configured with an NMOS transistor.

9. The semiconductor device as recited in claim 7, wherein the charge recycling switch is configured with a PMOS transistor.

10. The semiconductor device as recited in claim 7, wherein the first clock-first driver, the first clock-second driver, the first clock-third driver, the second clock-first driver, the second clock-second driver, and the second clock-third driver are configured with inverters, respectively.

11. The semiconductor device as recited in claim 7, wherein the first clock-first driver is configured with at least one inverter.

12. The semiconductor device as recited in claim 7, wherein the second clock-first driver is configured with at least one inverter.

13. The semiconductor device as recited in claim 7, further comprising:
   a first capacitor connected to the output terminal of the first clock-third driver; and
   a second capacitor connected to the output terminal of the second clock-third driver.

* * * * *